United States Patent Office 3,481,959
Patented Dec. 2, 1969

3,481,959
POLY-FUNCTIONAL ISOCYANATES PREPARED FROM POLYMERIZED FATTY ACIDS
Gert Egle, Hilden, Rhineland, Germany, assignor to Henkel & Cie., G.m.b.H., Dusseldorf-Holthausen, Germany, a corporation of Germany
No Drawing. Filed Apr. 20, 1966, Ser. No. 543,804
Claims priority, application Germany, Apr. 28, 1965, H 55,891
Int. Cl. C09f 7/00
U.S. Cl. 260—404.5     10 Claims

ABSTRACT OF THE DISCLOSURE

Process for the preparation of poly-functional isocyanates by reacting a polymeric fatty acid chloride and sodium azide in the presence of 0.1 to 50 volume percent of a dialkyl amide of a lower fatty acid.

---

It is well known that poly-functional isocyanates may be prepared by reacting the corresponding polyamines with phosgene. However, the preparation with phosgene presents various disadvantages, which may be traced to the characteristics of phosgene. Another method for preparing poly-functional isocyanates consists in the reaction of acid chlorides with sodium azide. For example, the acid chloride of sebacic acid, in chlorobenzene as solvent, may be reacted with sodium azide. [See Muller, Arbeitsmethoden der Organischen Chemie, vol. 8 (1952), p. 125]. This last mentioned reaction provides good yields. However, this simple process fails when applied to acid chlorides obtained from polymerized fatty acids. For the preparation of poly-functional isocyanates, derived from polymerized fatty acids, different methods have to be relied on, for example the reaction between the corresponding fatty acid amine and phosgene. However, resort to the latter type reaction brings to bear the disadvantages attendant with the use of phosgene. Hence, it would be advantageous to modify the generally known reaction between the acid chloride of an aliphatic carboxylic acid and sodium azide to obtain the reaction of the acid chlorides of polymerized fatty acids and sodium azide in order to avoid the disadvantages attendant with the use of phosgene.

Accordingly, it is an object of this invention to provide a new and improved method for preparing poly-functional isocyanates from polymerized fatty acids.

Another object of this invention is to provide a method of preparing poly-functional isocyanates from the reaction of the acid chlorides of polymerized fatty acids and sodium azide.

Another object of this invention is to provide poly-functional isocyanates from polymerized fatty acids.

A further object of this invention is to provide a process for the preparation of poly-functional isocyanates which comprises reacting a first member selected from the group consisting of a polymeric fatty acid chloride and mixtures thereof with sodium azide in the presence of from 0.1 to 50 volume percent, based on said first member, of an N,N-dialkyl-substituted amide of an alkanoic acid having from 1 to 4 carbon atoms, said dialkyl substituent having from 1 to 5 carbon atoms.

The process of the invention broadly follows the previously known reaction of acid chlorides and sodium azide, with the exception that an N,N-dialkyl substituted amide is added to the reaction mixture. Generally, the reaction mixture contains an acid chloride of a polymerized fatty acid or mixtures thereof, sodium azide and from 0.1 to 50 volume percent, based on the acid chloride, of an N,N-dialkyl substituted amide of an alkanoic acid, having from 1 to 4 carbon atoms. The N,N-dialkyl substituted amide remains unchanged throughout the course of the reaction.

As N,N-dialkyl substituted acid amides of alkanoic acids, those of formic, acetic, propionic, isobutyric or n-butyric acid may be mentioned as exemplary thereof. The alkyl substitutents should have about 1 to 5, and preferably 1 to 2 carbon atoms. According to the process of the invention the following may be employed: dimethylformamide, dimethylacetamide, dimethylbutyramide, diethylformamide. It is preferred, however, to use dimethylformamide. For the process of the invention relatively small quantities of the N,N-dialkyl substituted amide are required. Generally, about 0.1 to 50 volume percent, and preferably about 0.2 to 10 volume percent, based on polymerized fatty acid chlorides are used. The N,N-dialkyl amide may be diluted with other inert organic solvents.

The polymerized fatty acid chlorides are obtained from raw or purified mixtures of polymerized fatty acids by reaction with substances known for the preparation of carboxylic acid chlorides, such as thionylchloride, oxalylchloride or acetylchloride. The polymerized fatty acid mixtures contain predominantly dimeric and trimeric constituents, and are prepared in generally known manner from natural, unsaturated fatty acids having a chain length of from about 16 to 22, and preferably 18 carbon atoms. (See United States Patent No. 2,347,562.) The polymerized fatty acids have, as a rule, an average molecular weight of about 400 to 800 and acid numbers of about 165 to 220. Considerable amounts of monomeric, unsaturated fatty acids may also be present in the raw mixtures. However, their presence does not interfere with the preparation of the isocyanates according to the invention.

The sodium azide, which serves as a starting reactant, may be used without any pre-treatment in its commercial form. Generally, about equivalent quantities up to an excess of about 50 mol percent, based on the polymerized acid chloride, are used.

In addition to the N,N-dialkyl substituted acid amides, other inert solvents are advantageously employed, for example: hexane, heptane, octane, cyclohexane, methylcyclohexane, benzene, toluene, xylol, chlorobenzene, dichlorobenzene, nitrobenzene, di-ethyl ether, di-isopropyl ether, di-butyl ether, dioxane, diphenyl ether, acetonitrile, benzonitrile, dimethylsulfoxide and others. These solvents may conveniently be added in amounts of from 50 to 1000 volume percent, based on the polymerized fatty acid chlorides.

The reaction temperature is dependent on the solvents used and the reactivity of the acid chloride employed. In general, the reaction temperature lies between 40 and 200° C., and in particular between 60 and 140° C.

According to the process of the invention the reactants are admixed under total exclusion of moisture and, if necessary, with the addition of the inert organic solvents. By mechanical treatment, for example, by stirring, a desirable distribution of the sodium azide is obtained. The amount of the additional inert organic solvent is added in quantities so that an easily stirrable or pumpable reaction mixture results. Subsequent to admixing the reactants, the mixture is heated to reaction temperature. Due to occasional temperature increases, the mixture, if necessary, is cooled. The progress of the reaction can be determined by the evolution of nitrogen.

The process may also be carried out by adding liquid polymeric fatty acid chloride to a dispersion of sodium azide in the N,N-dialkylamide. If necessary, the acid chloride may be in diluted form. When the generation of nitrogen gas commences to abate, or the temperature begins to drop, the mixture is heated for a short time longer. For the reaction, as a rule, a period of one half hour to 10 hours, and in particular 2 to 6 hours, is required.

After the reaction is complete, the sodium chloride formed, which precipitates in coarse-grained and easily filterable form, is separated from the reaction mixture. The sodium chloride is separated by conventional methods such as by decanting, filtering or centrifuging. After removal of the sodium chloride, a solution of the poly-functional isocyanate in the inert organic solvent and the unchanged dialkyl-substituted acid amide remains. By distillation, advantageously carried out under reduced pressure, the isocyanate is separated from the inert organic solvent and acid amide.

After distilling the solvent and acid amide, the polyfunctional isocyanates have, in most cases, the calculated content of isocyanate. After a single distillation under satisfactory vacuum, substances are precipitated which are colorless or at best slightly tinted.

The process of the invention has been described with reference to mixtures of polymerized fatty acids. As a rule, polymerized fatty acids exist in mixture form and hence offer the most convenient method for preparing poly-functional isocyanates therefrom. However, the process of this invention also includes within its scope the preparation of poly-functional isocyanates from polymerized fatty acids in pure form.

When a dimeric fatty acid is utilized according to the process of the invention, the isocyanate produced therefrom is di-functional and contains from 32 to 44 carbon atoms. In a like manner, when a trimeric fatty acid is utilized, the isocyanate produced therefrom is tri-functional and contains from 48 to 66 carbon atoms. Since polymerized fatty acid mixtures consist essentially of the dimers and trimers, the poly-functional isocyanates produced from such a mixture will have an average content of more than 32 carbon atoms.

The process of the invention permits the preparation of poly-functional isocyanates, with an average content of more than 32 carbon atoms, directly from the acid chlorides of polymeric fatty acids. Thus, the round-about way through amines or acid hydrazides is eliminated.

The poly-functional isocyanates, prepared in accordance with the invention, are suitable for the preparation of poly-urethane coatings on various materials such as metals, elastomers, leathers, textiles and paper.

The following examples will further illustrate the invention and enable persons skilled in the art to understand the invention more completely. It is understood, however, that the examples are illustrative only and that the invention is not limited to the specific examples recited.

EXAMPLES I 300 grams of a mixture of polymerized fatty acids from cotton seed oil (composition=about 5% monomeric, 71% dimeric and 24% higher polymeric constituents; acid number=180) were introduced, dropwise, into 400 ml. of boiling oxalyl chloride and heated, under exclusion of moisture at reflux for 2 hours. After this time, the generation of chlorine gas ceased, and the excess oxalylchloride was distilled off under vacuum.

The mixture of the polymerized acid chlorides was diluted with 500 ml. of toluene and 20 ml. of dimethylformamide and heated to boiling, after adding 80 gm. of sodium azide. The mixture was stirred constantly. Within a period of 3 hours, 23.4 liters of nitrogen were formed. The reaction mixture was then allowed to cool to room temperature. The coarsely crystalline sodium chloride was then decanted off under a total absence of moisture and washed with anhydrous toluene. The inert solvent and dimethylformamide was distilled from the reaction mixture under vacuum.

291 gm. of a brown oil was obtained with an isocyanate number of 14.8. By molecular distillation at 180° C. and $3.5 \times 10^{-2}$ mm. Hg./cm.$^2$, an oil of light-yellow color was obtained, having an isocyanate number of 14.4.

EXAMPLE II 207 grams of a mixture of polymerized fatty acids from cotton seed oil (composition=about 20% dimeric as well as 80% trimeric and higher-molecular constituents; acid number=192) were introduced, dropwise into 300 ml. of boiling oxalylchloride and heated for 2 hours at reflux. After the formation of gas had stopped, the excess oxalylchloride was distilled off.

The mixture of the polymerized acid chlorides was diluted with 300 ml. of toluene and 20 ml. of dimethylformamide. After the addition of 70 gm. of commercial sodium azide the mixture was slowly heated under stirring. At a temperature of about 60° C. the formation of nitrogen commenced. At the same time the temperature rose to about 80° C. After the reaction was completed, the reaction mixture was heated for one half hour to attain the reflux temperature.

Under exclusion of moisture, the mixture was, after having been cooled, suctioned off from the precipitated coarsely-crystalline sodium chloride and the solvent was distilled off under vacuum. A brown, viscous oil was obtained with an osocyanate number of 14.8. The yield amounted to 205 gm.

EXAMPLE III

Example I was repeated, however, no dimethylformamide was added. Despite boiling the mixture for 4 hours at reflux, no formation of nitrogen was observed.

The same results were obtained, when chlorobenzene was used in place of toluene. In this case too, not nitrogen was liberated.

While certain specific examples and preferred modes of practice of the invention have been set forth, it is to be understood that the invention is not to be limited thereby and that various changes and modifications may be made in the invention without departing from the spirit of the disclosure or the scope of the appended claims.

I claim:

1. A process for the preparation of polyfunctional isocyanates which comprises reacting an acid chloride of an acid selected from the group consisting of a polymeric fatty acid and mixtures thereof having a molecular weight of 400 to 800 and an acid number of 165 to 220 with sodium azide in the presence of from 0.1 to 50 volume per cent, based on said acid chloride, of an N,N-dialkyl-substituted amide of an alkanoic acid having from 1 to 4 carbon atoms, said dialkyl substituent having from 1 to 5 carbon atoms.

2. A process according to claim 1, wherein said reaction is conducted at a temperature of from about 40° C. to 200° C.

3. A process according to claim 1, wherein said N,N-dialkyl substituted amide is selected from the group consisting of dimethylformamide, dimethylacetamide, dimethylbutyramide and diethylformamide.

4. A process according to claim 1, wherein said N,N-dialkyl substituted amide is dimethylformamide.

5. A process according to claim 1, wherein from 0.2 to 10 volume percent of said N,N-dialkyl substituted amide is utilized.

6. A process according to claim 1, wherein an inert solvent is present.

7. A process according to claim 6, wherein said solvent is selected from the group consisting of hexane, heptane, octane, cyclohexane, methylcyclohexane, benzene, toluene, xylol, chlorobenzene, dichlorobenzene, nitrobenzene, diethylether, di-isopropyl ether, di-butyl ether, dioxane, diphenyl ether, acetonitrile, benzonitrile, dimethylsulfoxide.

8. A process according to claim 1, wherein said acid consists essentially of a member selected from the group consisting of dimers, trimers and mixtures thereof.

9. A process according to claim 8, wherein said dimers have from about 32 to 44 carbon atoms and said trimers have from about 48 to 66 carbon atoms.

10. A process for the preparation of polyfunctional isocyanates which comprises reacting an acid chloride mixture prepared from polymerized fatty acids having an average molecular weight of from about 400 to 800 and an acid number of from about 165 to 220 with sodium azide in the presence of from 0.1 to 50 volume percent, based on said mixture, of an N,N-dialkyl substituted amide of an alkanoic acid having from 1 to 4 carbon atoms, said dialkyl substituent having from 1 to 5 carbon atoms.

References Cited

UNITED STATES PATENTS 2,514,328   7/1950   Jones.

OTHER REFERENCES

General Mills, DDI brand diisocyanate general data sheet, CDS August 1965.

DANIEL D. HORWITZ, Primary Examiner